United States Patent
Fan et al.

(10) Patent No.: US 10,032,051 B2
(45) Date of Patent: *Jul. 24, 2018

(54) LOCATING AN OBJECT BASED ON CHARGING/RESPONSE TIME

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,388

(22) Filed: Oct. 12, 2016

(65) Prior Publication Data

US 2017/0193257 A1 Jul. 6, 2017

Related U.S. Application Data

(63) Continuation of application No. 14/986,657, filed on Jan. 2, 2016, now Pat. No. 9,551,780.

(51) Int. Cl.
*G06K 7/10* (2006.01)
*G08B 13/24* (2006.01)

(52) U.S. Cl.
CPC ..... *G06K 7/10158* (2013.01); *G06K 7/10366* (2013.01); *G08B 13/2462* (2013.01)

(58) Field of Classification Search
CPC ........ G01S 5/0252; G01S 5/021; G07C 5/085
USPC ........................................................ 340/8.1
See application file for complete search history.

(56) References Cited

U.S. PATENT DOCUMENTS

| | | | |
|---|---|---|---|
| 6,184,651 B1 | 2/2001 | Fernandez et al. | |
| 7,030,761 B2 | 4/2006 | Bridgelall et al. | |
| 7,528,721 B2 | 5/2009 | Levin et al. | |
| 7,733,218 B2 * | 6/2010 | Drago | G06K 19/0716 340/10.33 |
| 9,551,780 B1 * | 1/2017 | Fan | G01S 5/0252 |
| 2006/0012475 A1 * | 1/2006 | Froitzheim | B60C 23/007 340/539.23 |
| 2008/0136635 A1 | 6/2008 | Malik | |
| 2011/0063113 A1 * | 3/2011 | Hook | G01S 5/0205 340/572.1 |
| 2011/0187600 A1 * | 8/2011 | Landt | G01S 3/02 342/458 |

(Continued)

OTHER PUBLICATIONS

Shu et al., "TOC: Localizing Wireless Rechargeable Sensors with Time of Charge," ACM Transactions on Sensor Networks, vol. 11, No. 3, Article 44, Feb. 2015, 22 page.

(Continued)

*Primary Examiner* — Vernal Brown
(74) *Attorney, Agent, or Firm* — Van Leeuwen & Van Leeuwen; Steven L. Bennett

(57) ABSTRACT

An approach is provided in which an RFID reader receives a response signal from an RFID tag affixed to an object. The RFID reader determines a tag charging time of the RFID tag based upon a first point in time that the RFID reader sent a request signal to the RFID tag and a second point in time that the response signal was received by the RFID reader. In turn, the RFID reader identifies a location of the object based on the tag charging time and generates a notification that includes the location of the object.

15 Claims, 10 Drawing Sheets

(56) References Cited

U.S. PATENT DOCUMENTS

| | | | |
|---|---|---|---|
| 2012/0223854 A1* | 9/2012 | Nogami | G01S 13/82 |
| | | | 342/127 |
| 2013/0187760 A1* | 7/2013 | Teran-Matus | G06Q 50/265 |
| | | | 340/10.1 |
| 2014/0277935 A1 | 9/2014 | Daman et al. | |
| 2014/0285317 A1 | 9/2014 | Shimizu et al. | |
| 2015/0048789 A1 | 2/2015 | Kim et al. | |

OTHER PUBLICATIONS

Zhao et al., "A battery-free RFID-based indoor acoustic localization platform," 2013 IEEE International Conference on RFID, Apr. 2013, Orlando, FL, pp. 110-117.

Fan et al., "Locating an Object Based on Charging/Response Time," U.S. Appl. No. 14/986,657, filed Jan. 2, 2016, 37 pages.

"List of IBM Patents or Patent Applications Treated as Related," Letter from Leslie A. Van Leeuwen, Oct. 12, 2016, 1 page.

* cited by examiner

| Location Table 250 | | |
|---|---|---|
| Response Time | Distance | Location |
| .05 sec | .5 m | trunk |
| .1 sec | 1 m | Back seat |
| .2 sec | 1.5 m | Back seat floorboard |
| .55 sec | 2 m | console |
| .85 sec | 2.5 m | Front seat |
| 1.1 sec | 3 m | Floor board |
| 2.2 sec | 3.5 m | hood |
| 6.0 sec | 4 m | Front bumper |

LOCATING AN OBJECT BASED ON CHARGING/RESPONSE TIME

BACKGROUND

The present disclosure relates to locating an object based on a tag charging time of the object's RFID tag in response to receiving a request signal from an RFID reader.

Laws and regulations exist that prohibit certain objects from being in particular locations in a vehicle. For example, many cities prohibit cell phones from being used in non-hands free mode. In addition, many areas prohibit certain objects from being stored in the vehicle's cabin, such as alcohol, firearms, etc., which should be located in the trunk of a vehicle.

Today, RFID (radio-frequency identification) tags are typically affixed to objects for tracking purposes, shoplifting prevention, etc. RFID systems utilize radio waves to automatically identify objects and typically consist of two main components, which are RFID readers and RFID tags. RFID tags contain an integrated circuit and an antenna, which are used to transmit data to the RFID reader (also called an interrogator). The reader then converts the radio waves to a more usable form of data.

RFID tags include active RFID tags, passive RFID tags, and semi-passive RFID tags. An active RFID tag is equipped with a battery that is a partial source or complete source of power for the tag's circuitry and antenna. A passive RFID tag does not contain a battery. Instead, the power is generated when the reader's radio waves forms a magnetic field in the RFID tag's coiled antenna, energizing the circuits in the tag. The tag then sends the information encoded in the tag's memory. Semi-passive tags use a battery to run the chip's circuitry, but send responses by drawing power from the reader's radio waves.

BRIEF SUMMARY

According to one embodiment of the present disclosure, an approach is provided in which an RFID reader receives a response signal from an RFID tag affixed to an object. The RFID reader determines a tag charging time of the RFID tag based upon a first point in time that the RFID reader sent a request signal to the RFID tag and a second point in time that the response signal was received by the RFID reader. In turn, the RFID reader identifies a location of the object based on the tag charging time and generates a notification that includes the location of the object.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is a diagram depicting an exemplary table that maps RFID tag distance to vehicle location;

DETAILED DESCRIPTION

Figure 1:
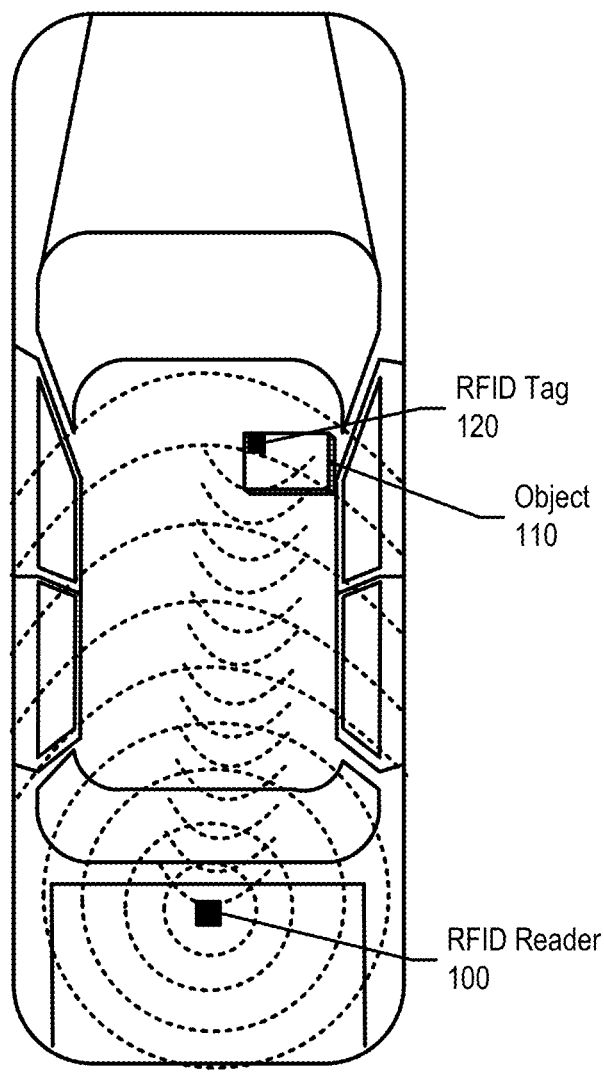
FIG. 1 is a diagram depicting an RFID reader querying an RFID tag affixed to an object.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIGS. 1 through 10 depict an information handling system that determines locations of objects in a vehicle based upon tag charging times of RFID tags affixed to the objects located in the vehicle. An RFID reader transmits a request signal that is received by RFID tags. The RFID tags include an energy storage, such as a capacitor, that charges in response to a magnetic field generated by the RFID tag's antenna while receiving the request signal. The rate at which the capacitor charges is based upon the signal strength of the request signal received at the RFID tag's antenna, which decreases in strength as the distance from the RFID reader increases. As such, the tag charging time of the RFID tag increases as the distance between the RFID reader and RFID tag increases. As a result, the RFID reader is able to determine the distance of the object from the RFID reader based upon the response time between the time at which a request is sent and the time at which a response is received.

Figure 6:
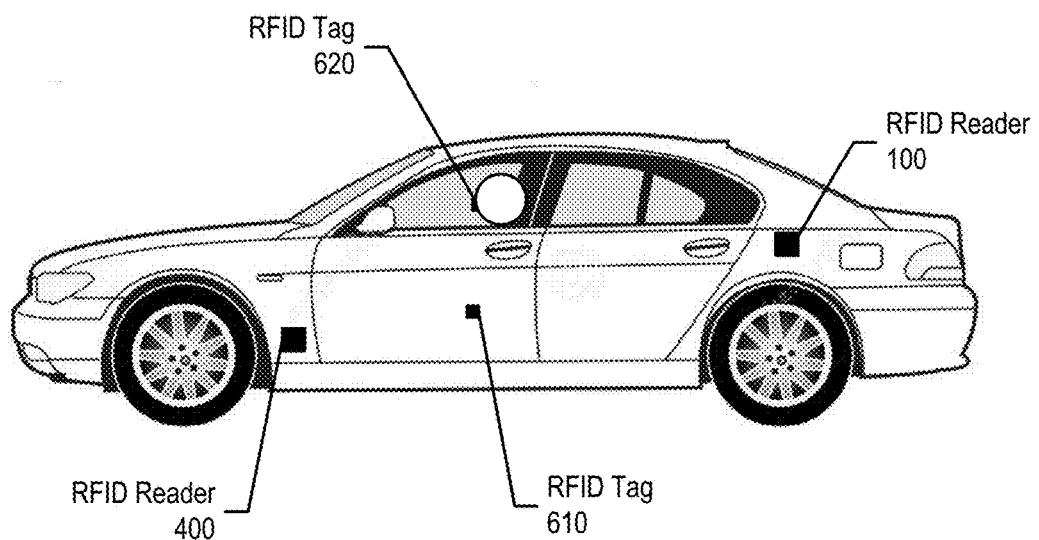
FIG. 6 is a diagram depicting a vehicle using multiple RFID readers to determine a three dimensional location of an object.

FIG. 1 is a diagram depicting an RFID reader querying an RFID tag affixed to an object. Vehicle 130 includes RFID reader 100, which may be a factory installed RFID reader or an aftermarket RFID reader. In one embodiment, as shown in FIG. 6, vehicle 130 may include multiple RFID readers to locate objects on a multi-dimensional basis and determine, for example, whether a cell phone is in a driver's pocket or next to the driver's ear.

Figure 3:
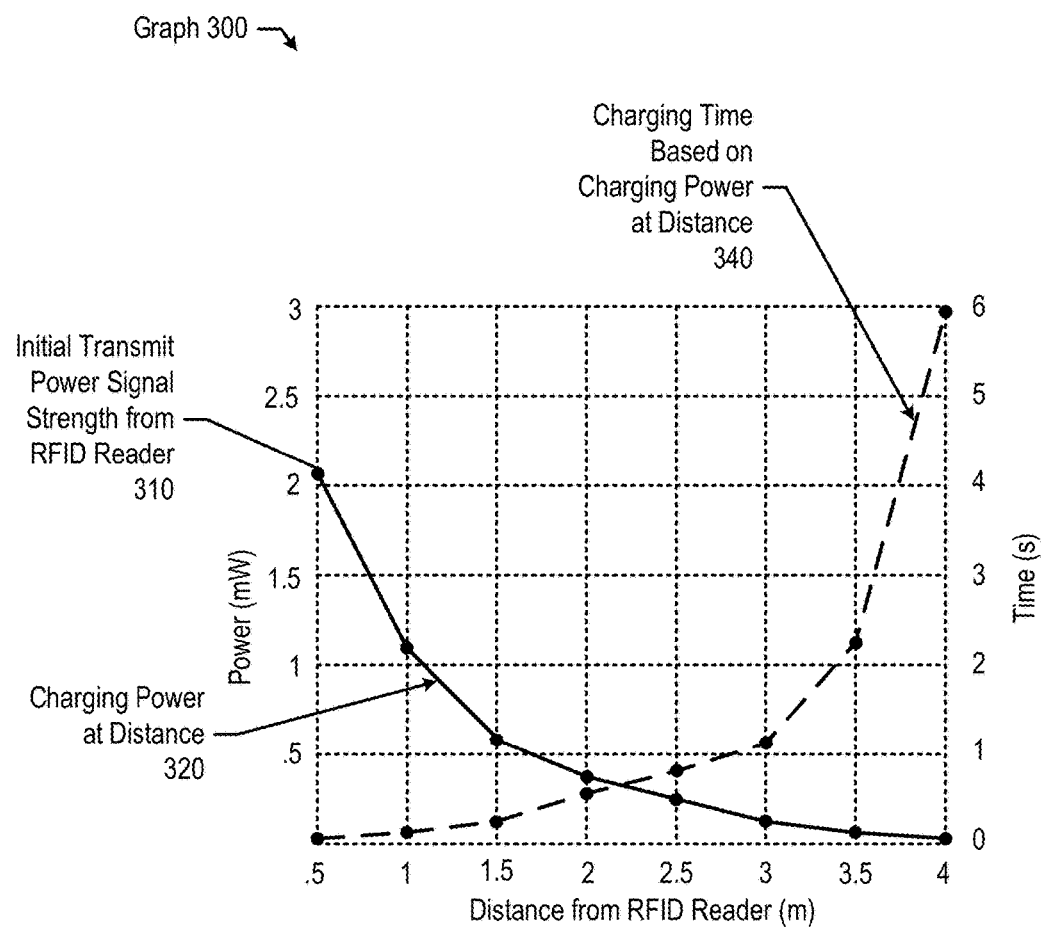
FIG. 3 is a diagram depicting an exemplary graph that shows RFID charging/response times based on relative distances from an RFID reader.

RFID reader 100 transmits a request signal at a "request point in time" in the form of radio waves within vehicle 130 and detected by RFID tag 120. RFID tag 120 is affixed to object 110, which may be an electronic device, a toy, a parcel package, or any object that has an affixed RFID tag. RFID tag 120's antenna develops a magnetic field from RFID reader 100s radio waves, which begins to charge RFID tag 120's capacitor. The capacitor charges to a discharge threshold based on the received signal strength of the request signal, which corresponds to the distance from RFID reader 100. FIG. 3 shows an exemplary graph that correlates transmit power to distance from RFID reader to capacitor charging time.

Once RFID tag 120's capacitor charges to the discharge threshold, RFID tag 120 transmits a response signal at back to RFID reader 100. RFID reader 100 receives the response signal at a "response point in time" and computes the distance between RFID reader 100 and RFID tag 120 based on the time difference, or response time, between the request point in time and the response point in time. In turn, RFID reader 100 determines object 110's location within vehicle 130. RFID reader 100 also analyzes the identification information in the response to determine information about object 110, such as its object type.

Once RFID reader 100 determines object 110's location and object type, RFID reader 100 generates a notification and determines whether to notify the driver, notify authorities, and/or log the event. For example, RFID reader 100 may determine that a gun is in the front seat of vehicle 130. In this example, RFID reader 100 may log the event but notify authorities if the driver is pulled over for various reasons. In another example, RFID reader 100 may detect that the driver is using a cell phone while driving and notify the driver to discontinue use of the cell phone.

Figure 2:
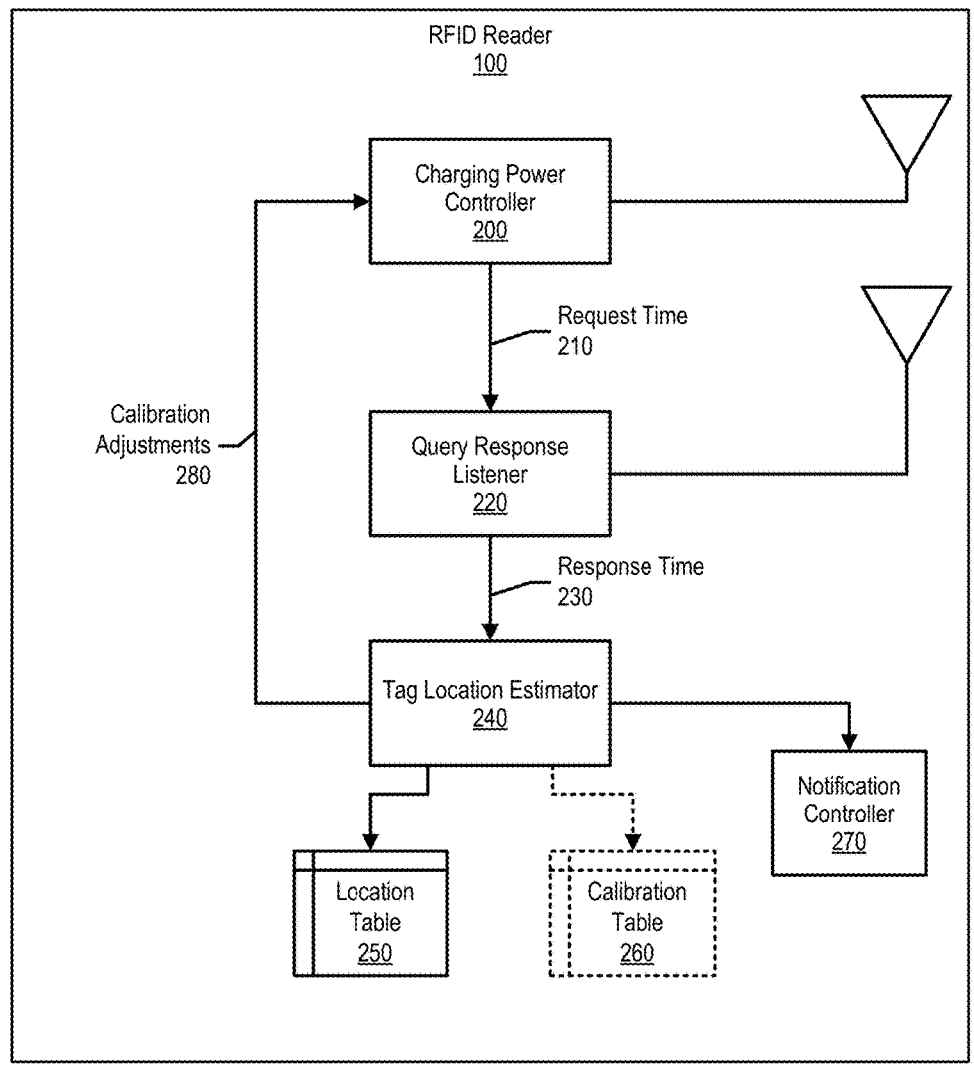
FIG. 2 is a high-level diagram depicting one embodiment of various components of an RFID reader.

FIG. 2 is a high-level diagram depicting one embodiment of various components of an RFID reader. RFID reader 100 includes charging power controller 200, which is an enhanced controller for dynamically deciding and calibrating the charging power of a request signal. The dynamic charging power improves the positioning accuracy and provides services for continuous object tracking. The dynamic charging power also fights against drivers using other RFID readers to pollute the system data, such as by adding an RFID reader to shorten the charging time and pretend certain objects are in the trunk area that are actually in the front passenger seats.

Query response listener 220 monitors response signals from RFID tags and compares the time of the request point in time (request time 210) against the received response's point in time to compute response time 230.

Tag location estimator 240 is, in one embodiment, an enhanced machine learning module that correlates the response time to RFID tag distance. Tag location estimator 240 may use location table 250, for example, to perform the correlation, which may also include correlations to physical locations within the vehicle. FIG. 4 shows an example of location table 250. Tag location estimator 240's results may then be sent to notification controller 270.

Notification controller 270 may store object information and object location information in a log, notify the driver, and/or notify authorities. For example, notification controller 270 may be Bluetooth equipped to send messages to vehicle 120's audio and/or video system to notify the driver to discontinue use of a cell phone. Notification controller 270 may also be equipped with cellular capability to notify authorities accordingly.

Figure 7:
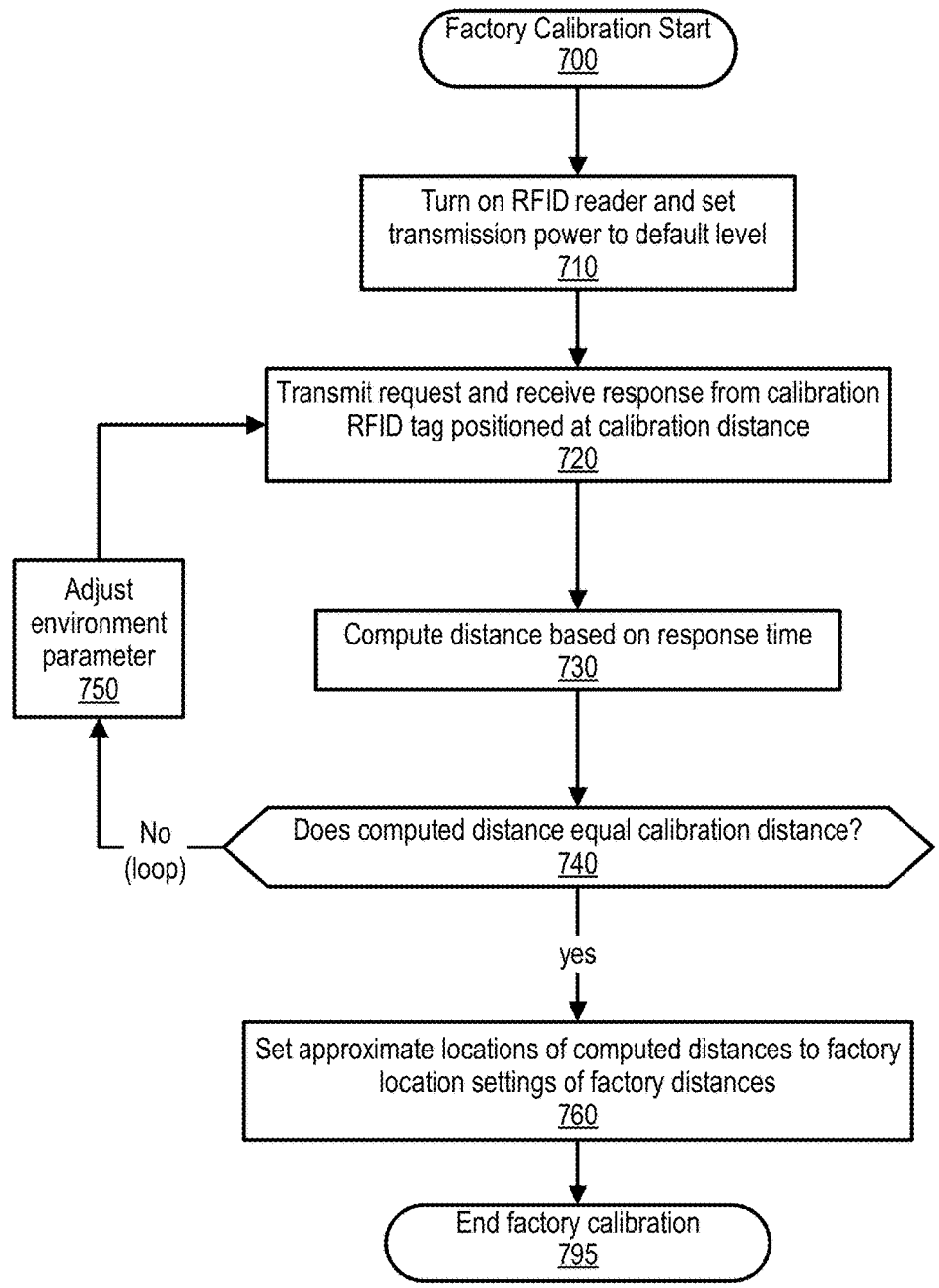
FIG. 7 is a high level flowchart depicting steps taken to calibrate an RFID reader at a vehicle factory.
Figure 8:
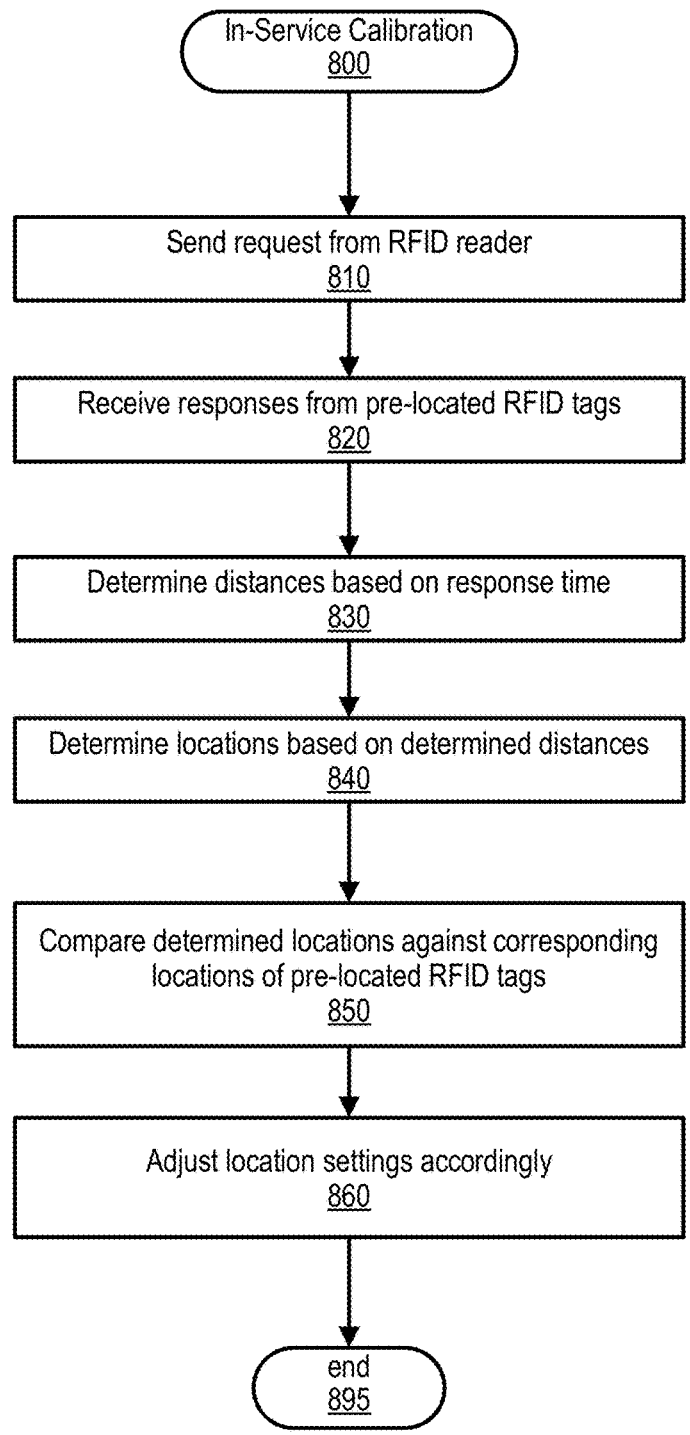
FIG. 8 is a flowchart showing steps taken to perform an in-service calibration of the RFID reader.

At times, RFID reader 100 performs calibration steps to ensure RFID reader 100 distance measurements are accurate. Calibrations may be performed at the vehicle's factory as well as when the vehicle is in service, such as every three months. FIG. 7 shows steps performed during factory calibration and FIG. 8 shows steps performed during in-service calibration.

In one embodiment, tag location estimator 240 uses calibration table 260 during the calibration process to calibrate charging power controller 200. Calibration table 260 may have entries corresponding to pre-located RFID tags, such as those installed in the factory. For example, a pre-located RFID tag may be installed in the center of the cab of a vehicle that may be 2.54 meters away from the RFID reader. In this example, calibration table 260 may have an entry that indicates the pre-located RFID tag should have a 0.86 second response time (referring to FIG. 3). As such, when tag location estimator 240 receives a response time shorter or longer than 0.86 seconds, tag location estimator 240 sends calibration adjustments 280 to charging power controller 200 to increase or decrease the power of the request signal.

FIG. 3 is a diagram depicting an exemplary graph that shows RFID charging/response times based on relative distances from an RFID reader. Diagram 300 shows how the signal strength of a request signal degrades over distances (plot 320), and how the transmission power correlates to the charging/response time of an RFID tag (plot 340). Plot 320 is based upon initial transmit power 310, which shows a current value of 2.1 mW. As discussed earlier, RFID reader 100 performs calibration steps to calibrate the initial transmit power and achieve accurate readings.

Plot 340 correlates the amount of time to charge an RFID tag's capacitor to the discharge threshold based upon the amount of charging power from plot 320. For example, the charging power at 2.5 meters is 0.5 mW, which charges the capacitor to the discharge threshold in 0.85 seconds. In one embodiment, RFID reader 100 may have a 0.1 meter accuracy of the actual location of object. FIG. 4 shows an illustrative example of plot 340 that correlates response time to distance from the RFID reader.

FIG. 4 is a diagram depicting an exemplary table that maps RFID tag distance to vehicle location. Location table 250 includes columns 400, 410, and may also include column 420. Location table 250 may be preconfigured at the factory or dynamically adjusted during in-service calibration procedures.

Column 400 includes response times of RFID tags, which are correlated to distance measurements in column 410. Column 420 includes locations within the vehicle that are correlated to the distance measurements. As such, RFID reader 100 may determine that a gun is at a distance of 1.5 meters, indicating that the gun is located on the vehicle's back seat floorboard instead of the front seat.

In one embodiment, vehicle 130 may have pre-located RFID tags installed on vehicle seats. In this embodiment, RFID reader 100 is able to adjust for seat adjustments and determine whether objects are behind a seat or in front of a seat (see FIG. 5 and corresponding text for further details). In another embodiment, the locations may be more generic such as a front cabin area, a rear cabin area, a trunk area, etc.

Figure 5:
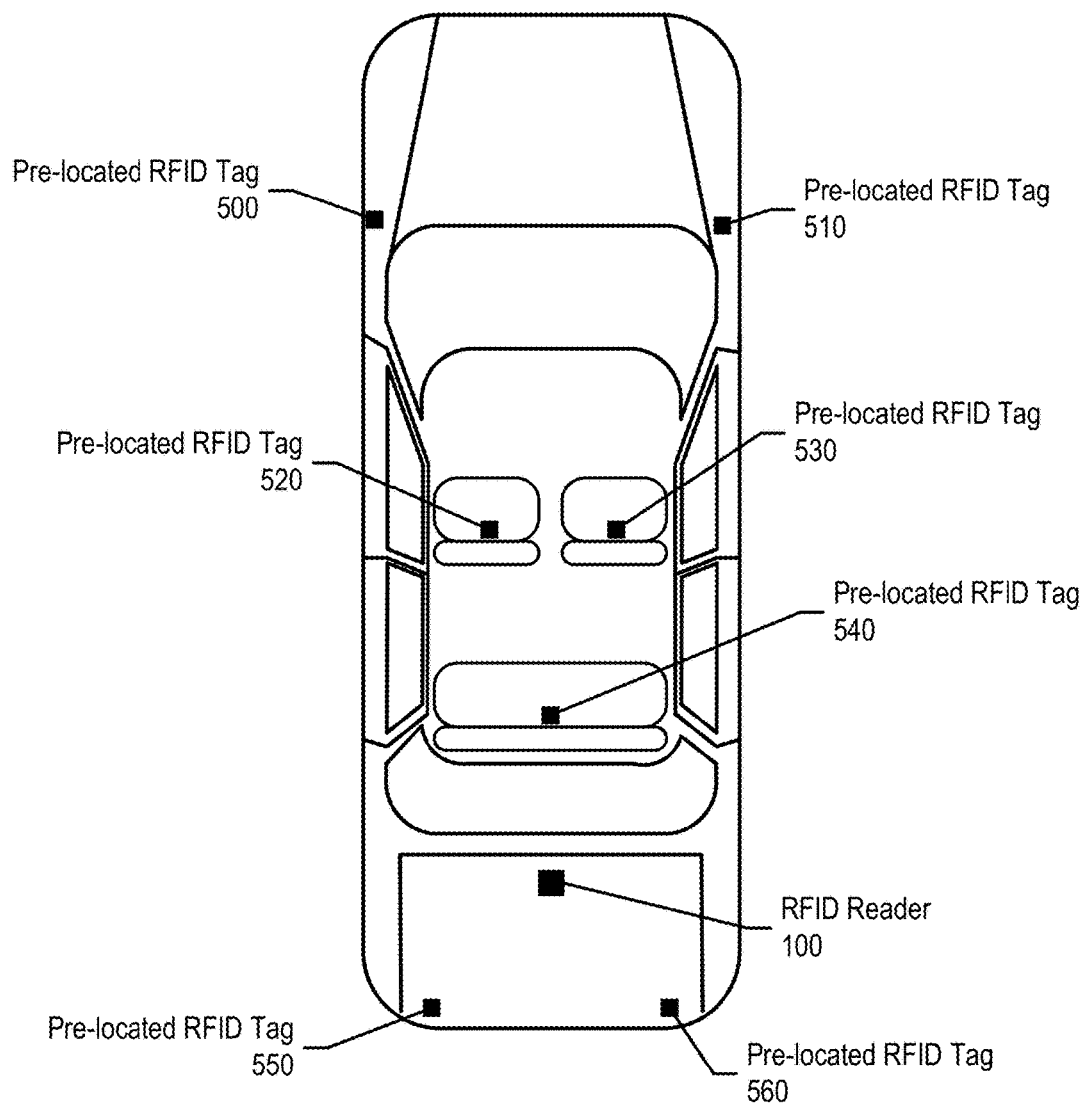
FIG. 5 is a diagram depicting a vehicle with pre-located RFID tags for calibrating the object location system.

FIG. 5 is a diagram depicting a vehicle with pre-located RFID tags for calibrating the object location system. Vehicle 130 may include some or all of pre-located RFID tags 500, 510, 520, 530, 540, 550, and 560 for calibration purposes. In one embodiment, RFID reader 100 may use responses from pre-located RFID tags 500, 510, 550, and 560 to determine the edge distance of the vehicle cabin and trunk. In another embodiment, RFID reader 100 may use pre-located RFID tags 520, 530, and 540 to determine current seat locations and more accurately identify object locations.

FIG. 6 is a diagram depicting a vehicle using multiple RFID readers to determine a three dimensional location of an object. Vehicle 130 may include multiple RFID readers, such as RFID reader 100 and RFID reader 400. RFID reader 400 may be a factory installed RFID reader that is used to detect Key FOB's in proximity to the car for unlocking doors or enabling engines to start.

As those skilled in the art can appreciate, when vehicle 130 includes two RFID readers, the RFID readers may work in conjunction to determine a "Z-axis" location of an object. As such, the RFID readers are able to differentiate locations between a user's cell phone in the user's pocket (RFID tag 610) versus the user's cell phone by the user's ear (RFID tag 620) even though the distance from RFID reader 100 may be the same.

FIG. 7 is a high level flowchart depicting steps taken to calibrate an RFID reader at a vehicle factory. FIG. 7 processing commences at 700 whereupon, at step 710, the process turns on an RFID reader and sets the RFID reader's transmission power to a default level, such as level 5 from a scale from 1-10. As discussed earlier, the RFID reader's transmission power is set to a value that is strong enough to cover the area of a vehicle but not too strong such that RFID tags located at the extreme locations of the vehicle are not instantly charged.

At step 720, the process transmits a calibration request signal and receives a calibration response signal from a calibration RFID tag positioned at a pre-located distance. For example, the factory may position a calibration RFID tag in the center of the vehicle, exactly 2.0 meters from the installed RFID reader. At step 730, the process computes a calibration distance based on response time, and determines as to whether the calibration distance equals the pre-located distance (decision 740). Using the example above, the process computes a distance and determines whether the computed calibration distance equals 2.0 meters.

If the computed distance does not equal the pre-located distance, then decision 740 branches to the 'yes' branch, which loops back to step 750 and adjusts an environment parameter to result in more accurate distance computations. In one embodiment a simplified equation for a received charging power at a location is $P\_charger/(distance+environment parameter)^2$. In one embodiment, the process may adjust the RFID reader transmission power output level if the process detects a malicious RFID reader attempting to alter the computed distances. This looping continues until the computed distance equals the calibration distance, at which point decision 740 branches to the 'yes' branch.

At step 760, the process sets approximate locations of computed distances to factory location settings of factory distances. For example, the process may generate a location table such as table 400 shown in FIG. 4 that maps response time, distance, and vehicle location. In this example, the process may inform law enforcement as to the location of an object in terms of vehicle location instead of distance from the RFID reader. FIG. 7 processing thereafter ends at 795.

FIG. 8 is a flowchart showing steps taken to perform an in-service calibration of the RFID reader. The RFID reader may require in-service calibrations from time to time. For example, a user may install aftermarket stereo equipment that alters the propagation of the RFID reader's radio waves. In one embodiment, the RFID reader may perform an in-service calibration when a seat is adjusted in the vehicle. In this embodiment, the vehicle may have pre-located RFID tags under each seat, which the RFID reader may utilize to provide more accurate location information (see FIG. 5 and corresponding text for further details). In another embodiment, the RFID reader may dynamically adjust the power and recalibrate the system if an attacker installs RFID readers for interference purposes, such as to shorten the response time an indicate that objects are in the trunk when they are actually in the front seat.

FIG. 8 processing commences at 800 whereupon, at step 810, the process sends a calibration request signal from the RFID reader and, at step 820, the process receives calibration response signals from pre-located RFID tags affixed at specific locations in the vehicle. At step 830, the process determines calibration distances based on response times as discussed herein and, at step 840, the process determines locations based on the determined distances, such as by using a calibrated location table shown in FIG. 4.

At step 850, the process compares the determined distances and locations against corresponding distances and locations of pre-located RFID tags. For example, the process may know that a pre-located RFID tag is located in the center of the vehicle at 2.5 meters away and know that the response time should be 0.85 seconds. In this example, if the process receives a response at a time other than 0.85 seconds, the process needs to adjust the RFID reader transmit power accordingly (step 860) as discussed in FIG. 7. FIG. 8 processing thereafter ends at 895.

Figure 9:
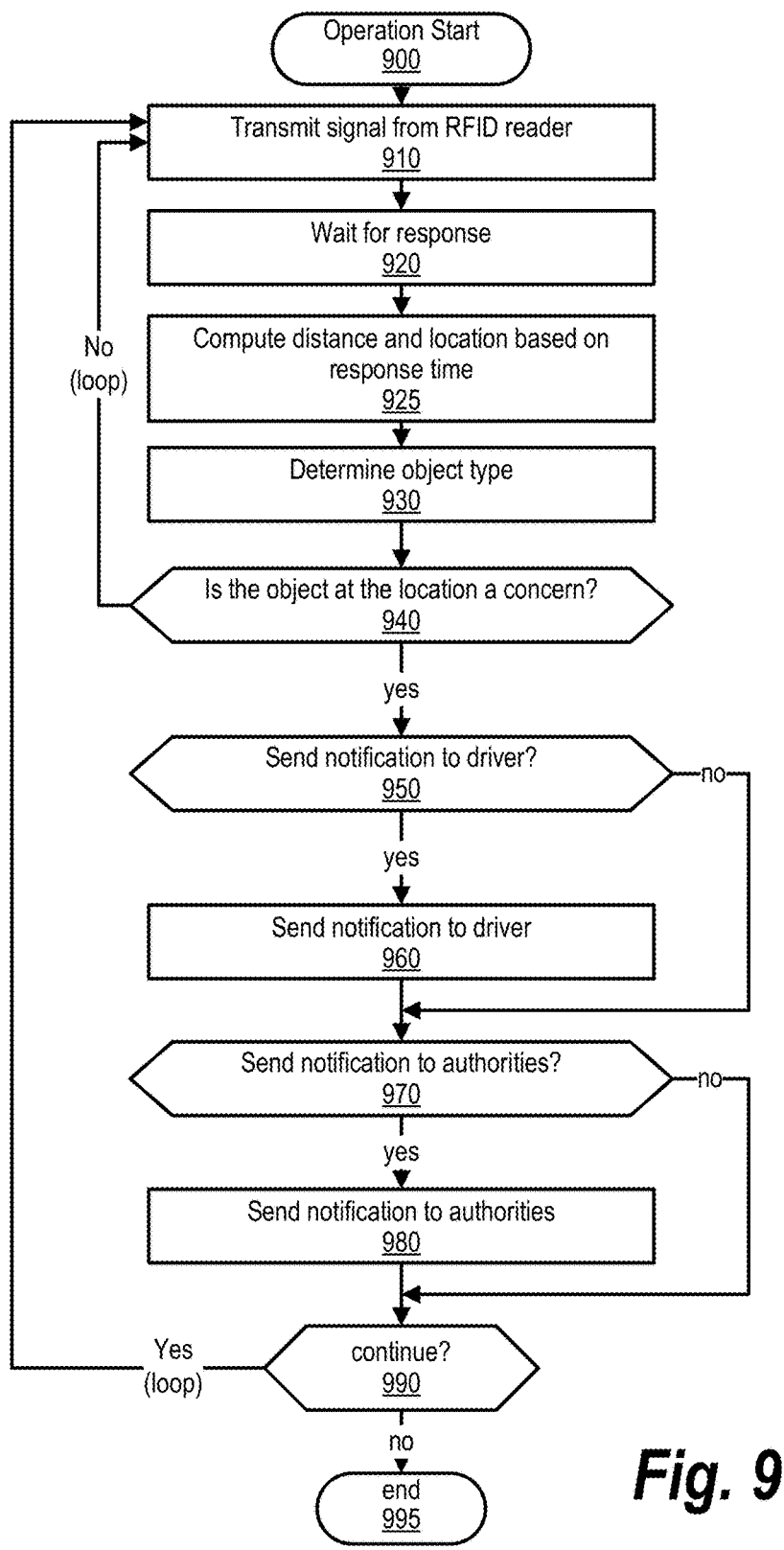
FIG. 9 is a flowchart showing steps taken to determine in-vehicle locations of objects.

FIG. 9 is a flowchart showing steps taken to determine in-vehicle locations of objects. Processing commences at 900 whereupon, at step 910, the process transmits a request signal from the RFID reader. At step 920, the process waits for responses from RFID tags affixed to objects within the vehicle. At step 925, the process receives a response and computes a distance and location of the RFID tag based on the response time as discussed herein.

At step 930, the process determines an object type of the corresponding object. For example, the process may determine that the object is a cell phone based on object information transmitted by the RFID tag. The process determines as to whether the object type stored at the computed location is a concern (decision 940). For example, the process may determine that a child's toy is located in the back seat, which is not a concern. However, the process may determine that a liquor bottle is located in the vehicle's front seat, which is a concern.

If is the object located at the computed location is not a concern, then decision 940 branches to the 'no' branch and loops back to transmit request RFID signals and process responses. This looping continues until the process determines that an object type located at a computed location is a concern, at which point decision 940 branches to the "Yes" branch.

The process determines as to whether to send a notification to the driver based upon, for example, pre-defined user settings (decision 950). For example, the process may determine that the driver has a cell phone in proximity to the driver's ears and warn the driver to re-locate the cell phone. If the process should send a notification to the driver, then decision 950 branches to the 'yes' branch whereupon, at step 960, the process sends a notification to driver, such as an audio warning, a visual warning, or both. On the other hand, if the process should not send a notification to the driver, then decision 950 branches to the 'no' branch bypassing step 960.

The process determines as to whether to send a notification to authorities (decision 970). For example, the process may determine that a liquor bottle is in proximity to the front driver seat. If the process should send a notification to authorities, then decision 970 branches to the 'yes' branch whereupon, at step 980, the process sends a notification to authorities. On the other hand, if the process should not send a notification to authorities, then decision 970 branches to the 'no' branch.

The process determines as to whether continue monitoring RFID tag locations, such as while the vehicle is operational (decision 990). If the process should continue, then decision 990 branches to the 'yes' branch which loops back to process RFID tag responses. This looping continues until the process should terminate, at which point decision 990 branches to the 'no' branch exiting the loop. FIG. 9 processing thereafter ends at 995.

Figure 10:
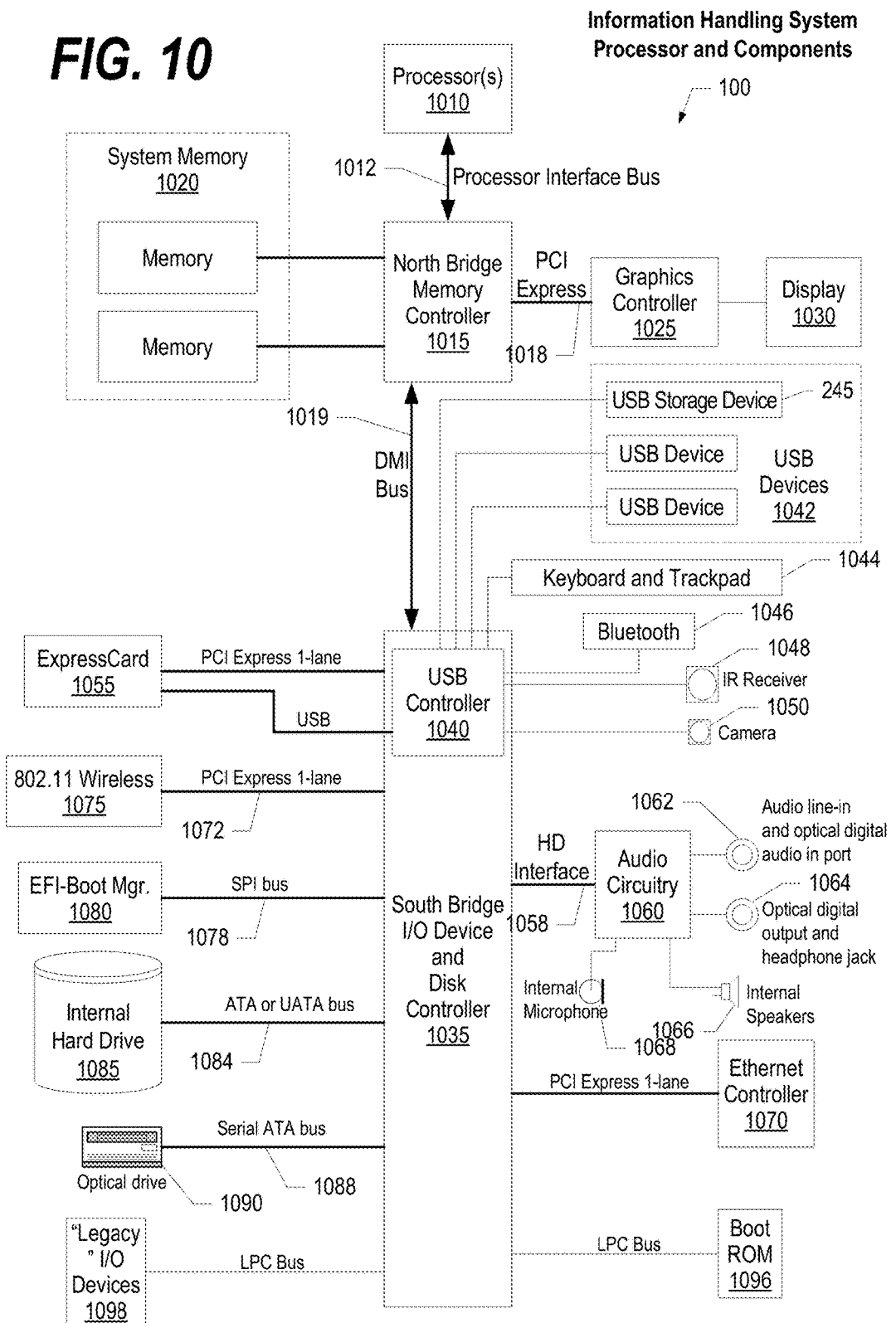
FIG. 10 is a block diagram of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
calibrating an RFID reader in a vehicle in response to detecting a malicious RFID reader within the vehicle, wherein the calibrating comprises adjusting a power level of the RFID reader;
in response to calibrating the RFID reader, sending a request signal from the RFID reader to an RFID tag, wherein the RFID reader begins transmitting the request signal at a first point in time;
receiving, at the RFID reader, a response signal from the RFID tag at a second point in time;
determining a tag charging time of the RFID tag based upon the first point in time and the second point in time;
computing, by the RFID reader, a distance from the RFID reader to the RFID tag based on the tag charging time of the RFID tag;
identifying a location of the object based upon the computed distance; and
generating a notification that includes the location of the object.

2. The method of claim 1 wherein the location of the object is within the vehicle.

3. The method of claim 1 wherein the calibrating further comprises:
transmitting a calibration request signal from the RFID reader at a third point in time;
receiving a calibration response signal from a pre-located RFID tag at a fourth point in time that is at a pre-located distance;
determining a calibration response time based upon the third point in time and the fourth point in time;
determining a calibration distance based on the calibration response time;
comparing the calibration distance with the pre-located distance; and
adjusting the power level of the RFID reader based upon the comparison.

4. The method of claim 3 wherein the pre-located RFID tag is affixed to an adjustable seat, the method further comprising:
performing the calibrating in response to detecting that the adjustable seat moved from a first seat location to a second seat location.

5. The method of claim 1 wherein a different RFID reader is installed in the vehicle, the method further comprising:
determining, by the different RFID reader, a different distance from the different RFID reader to the RFID tag based on a different response time computed by the different RFID reader;
sending the different response time from the different RFID reader to the RFID reader; and
determining, by the RFID reader, a 3-dimensional space location of the object using the different distance and the distance determined by the RFID reader.

6. The method of claim 1 further comprising:
determining an object type of the object based upon object information extracted from the response signal.

7. The method of claim 1 further comprising:
determining an object type of the object based upon object information extracted from the response signal; and
sending the notification to one or more authorities based upon the object type and the location of the object.

8. An information handling system comprising:
one or more processors;
a memory coupled to at least one of the processors; and
a set of computer program instructions stored in the memory and executed by at least one of the processors in order to perform actions of:
calibrating the information handling system in a vehicle in response to detecting a malicious RFID reader within the vehicle, wherein the calibrating comprises adjusting a power level of the information handling system;
in response to calibrating the information handling system, beginning transmission of a request signal to an RFID tag at a first point in time;
receiving a response signal from the RFID tag at a second point in time;
determining a tag charging time of the RFID tag based upon the first point in time and the second point in time;
computing a distance from the information handling system to the RFID tag based on the tag charging time of the RFID tag;
identifying a location of the object based upon the computed distance; and
generating a notification that includes the location of the object.

9. The information handling system of claim 8 wherein the calibration results in at least one of the one or more processors perform additional actions comprising:
transmitting a calibration request signal from the information handling system at a third point in time;
receiving a calibration response signal from a pre-located RFID tag at a fourth point in time that is at a pre-located distance;
determining a calibration response time based upon the third point in time and the fourth point in time;
determining a calibration distance based on the calibration response time;
comparing the calibration distance with the pre-located distance; and
adjusting the power level of the information handling system based upon the comparison.

10. The information handling system of claim 9 wherein the pre-located RFID tag is affixed to an adjustable seat, wherein at least one of the one or more processors perform additional actions comprising:
performing the calibrating in response to detecting that the adjustable seat moved from a first seat location to a second seat location.

11. The information handling system of claim 8 wherein a different information handling system is installed in the vehicle, wherein at least one of the one or more processors perform additional actions comprising:
determining, by the different information handling system, a different distance from the different information handling system to the RFID tag based on a different response time computed by the different information handling system;
sending the different response time from the different information handling system to the information handling system; and
determining, by the information handling system, a 3-dimensional space location of the object using the different distance and the distance determined by the information handling system.

12. The information handling system of claim 8 wherein at least one of the one or more processors perform additional actions comprising:
- determining an object type of the object based upon object information extracted from the response signal; and
- sending the notification to one or more authorities based upon the object type and the location of the object.

13. A computer program product stored in a computer readable storage medium, comprising computer program code that, when executed by an information handling system, causes the information handling system to perform actions comprising:
- calibrating the information handling system in a vehicle in response to detecting a malicious RFID reader within the vehicle, wherein the calibrating comprises adjusting a power level of the information handling system;
- in response to calibrating the information handling system, sending a request signal from the information handling system to an RFID tag,
- wherein the information handling system begins transmitting the request signal at a first point in time;
- receiving, at the information handling system, a response signal from the RFID tag at a second point in time;
- determining a tag charging time of the RFID tag based upon the first point in time and the second point in time;
- computing, by the information handling system, a distance from the information handling system to the RFID tag based on the tag charging time of the RFID tag;
- identifying a location of the object based upon the computed distance; and
- generating a notification that includes the location of the object.

14. The computer program product of claim 13 wherein the calibrating results in the information handling system performing additional actions comprising:
- transmitting a calibration request signal from the information handling system at a third point in time;
- receiving a calibration response signal from a pre-located RFID tag at a fourth point in time that is at a pre-located distance;
- determining a calibration response time based upon the third point in time and the fourth point in time;
- determining a calibration distance based on the calibration response time;
- comparing the calibration distance with the pre-located distance; and
- adjusting the power level of the information handling system based upon the comparison.

15. The computer program product of claim 13 wherein a different information handling system is installed in the vehicle, and wherein the information handling system performs additional actions comprising:
- determining, by the different information handling system, a different distance from the different information handling system to the RFID tag based on a different response time computed by the different information handling system;
- sending the different response time from the different information handling system to the information handling system; and
- determining, by the information handling system, a 3-dimensional space location of the object using the different distance and the distance determined by the information handling system.

* * * * *